United States Patent
Kwon et al.

(10) Patent No.: US 11,005,699 B2
(45) Date of Patent: *May 11, 2021

(54) DISTRIBUTED ANTENNA SYSTEM-BASED ON TIME SENSITIVE NETWORK

(71) Applicant: SOLiD, Inc., Seongnam-si (KR)

(72) Inventors: Dong Hee Kwon, Seongnam-si (KR); Hoo Pyo Hong, Seongnam-si (KR); Young Man Cho, Seoul (KR); Dae Young Kim, Seoul (KR); Hyun Jung Kim, Yongin-si (KR)

(73) Assignee: SOLID, INC., Seongnam-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/026,129

(22) Filed: Sep. 18, 2020

(65) Prior Publication Data

US 2021/0006450 A1    Jan. 7, 2021

Related U.S. Application Data

(63) Continuation of application No. 16/442,460, filed on Jun. 15, 2019, now Pat. No. 10,785,082.

(30) Foreign Application Priority Data

Sep. 19, 2018  (KR) .......... 10-2018-0112317
Jan. 31, 2019  (KR) .......... 10-2019-0012655

(51) Int. Cl.
*H04L 27/34*   (2006.01)
*H04L 12/709*  (2013.01)
*H04L 12/851*  (2013.01)
*H04L 12/721*  (2013.01)

(52) U.S. Cl.
CPC ........ *H04L 27/3405* (2013.01); *H04L 45/245* (2013.01); *H04L 45/70* (2013.01); *H04L 47/24* (2013.01)

(58) Field of Classification Search
CPC ... H04L 27/3404; H04L 45/245; H04L 45/70; H04L 47/24
(Continued)

(56) References Cited

U.S. PATENT DOCUMENTS 9,847,816 B2   12/2017  Zhuang et al.
10,531,476 B2   1/2020  Rost et al.
(Continued)

FOREIGN PATENT DOCUMENTS

KR    2016/0101086 A    8/2016
KR    10-1877004 B1    7/2018
(Continued)

OTHER PUBLICATIONS

The Extended European Search Report dated Nov. 15, 2019 for European Application No. 19180803.9.
(Continued)

*Primary Examiner* — Ted M Wang

(57) ABSTRACT

A TSN-based distributed antenna system including a headend unit, one or more TSN switches, and one or more remote units and a fronthaul transport network constituted by the headend unit, the TSN switch, and the remote unit is provided. The packet-based fronthaul network constituted by the headend unit, the TSN switch, and the remote unit transmits traffic in a time-deterministic manner while minimizing packet loss through Ethernet to which TSN standards are applied.

18 Claims, 9 Drawing Sheets

(58) Field of Classification Search
USPC .......................................................... 375/261
See application file for complete search history.

(56) References Cited

U.S. PATENT DOCUMENTS

| | | |
|---|---|---|
| 2010/0309932 A1 | 12/2010 | Diab et al. |
| 2017/0366268 A1 | 12/2017 | Trajkovic et al. |
| 2018/0070373 A1* | 3/2018 | Muench ................... H04L 47/14 |
| 2018/0097659 A1 | 4/2018 | Hanson |
| 2018/0124482 A1 | 5/2018 | Bottari et al. |
| 2018/0310199 A1* | 10/2018 | Halabian ........... H04W 28/0252 |
| 2019/0104072 A1 | 4/2019 | Kwon et al. |

FOREIGN PATENT DOCUMENTS

| | | |
|---|---|---|
| WO | 2016/168651 A1 | 10/2016 |
| WO | 2017/197341 A1 | 11/2017 |

OTHER PUBLICATIONS

Muhammad Waqar et al. "A Transport Scheme for Reducing Delays and Jitter in Ethernet-Based 5G Fronthaul Networks", Digital Object Identifier 10.1109, Aug. 9, 2018.

Alimi Isiaka Ajewale et al., "Toward an Efficient C-RAN Optical Fronthaul for the Future Networks: A Tutorial on Technologies, Requirements, Challenges, and Solutions", IEEE Communications Surveys & Tutorials, vol. 20, No. 1, First Quarter 2018, Feb. 23, 2018.

An office action dated Mar. 2, 2020 for Korean Application No. 10-2019-0012655.

A non-final office action dated Jan. 30, 2020 for U.S. Appl. No. 16/442,460.

A notice of allowance dated May 15, 2020 for U.S. Appl. No. 16/442,460.

U.S. Appl. No. 16/442,460, filed Jun. 15, 2019.

* cited by examiner

DISTRIBUTED ANTENNA SYSTEM-BASED ON TIME SENSITIVE NETWORK

CROSS-REFERENCE TO RELATED APPLICATION(S)

This application is a continuation application of U.S. application Ser. No. 16/442,460, filed on Jun. 15, 2019, which claims priority from Korean Patent Application No. 10-2018-0112317, filed on Sep. 19, 2018 and Korean Patent Application No. 10-2019-0012655, filed on Jan. 31, 2019, in the Korean Intellectual Property Office, the disclosures of which are incorporated herein by reference in their entirety.

BACKGROUND

1. Field

The following description relates to a distributed antenna system capable of transmitting frames in a time-deterministic manner.

2. Description of Related Art

A distributed antenna system includes a headend unit connected to a base station of a mobile communication system, a remote unit connected to the headend unit through a transmission medium such as an optical cable, a hub unit selectively relaying signals between the headend unit and the remote unit, and the like, and is installed in an area in which radio waves are not received or weakly received, such as inside of a building, a subway, a tunnel, and the like, to expand the coverage of signals of the base station.

Such a distributed antenna system mainly serves to relay signals of a macro radio base station of a mobile communication service provider, but there is a recent trend of recognizing the distributed antenna system as a communication network not only serving as a radio signal relay but also serving as a communication network as a general network. Such a trend is further increased when a desired area or space is entirely laid with the distributed antenna system as in the case of a building, a subway station, or the like. In particular, when the distributed antenna system is utilized as a general network for delivering a long-term evolution (LTE) small cell traffic and a WiFi access point (AP) traffic etc., a backhaul transmission function for processing such general network traffic is in demand.

In addition, in the 4G mobile communication network, since a radio access network (RAN) is changed into a centralized radio access network (C-RAN) structure, a base band unit (BBU) and a remote radio head (RRH) are installed separately from each other, wherein the BBU is located on a station or master cell site, the RRH is located on a cell site, and the BBU and the RRH are connected to each other by a fronthaul transmission protocol such as a common public radio interface (CPRI). Moreover, the future mobile communication network including 5G network, where increased radio transmission bandwidth far more than that of 4G network and massive multi-input and multi-output (MIMO) are essential, is expected to require hundreds of Gbps of CPRI capacity. For that reason, the traditional circuit-based fronthaul networks in 4G are migrating toward to packet-based fronthaul networks with the efforts of enhanced common public radio interface (eCPRI) standardization and the introduction of new approach called MAC-PHY split that tries to reduce the bandwidth consumption of fronthaul networks and to make use of cheap and widely used packet-based networks even by relocating or redefining the functionality of BBU and RRH. Such a packet based fronthaul transmission function is also in demand for the distributed antenna system.

A circuit-based distributed antenna system has difficulty in accommodating a backhaul service and a fronthaul service in addition to a distributed antenna system (DAS) frame processing. A distributed antenna system that provides the transport of radio signals for DAS service, the fronthaul service, and the backhaul service at once over a packet-based network is in demand.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

The following description relates to a packet-based distributed antenna system capable of being applied to a mobile communication system in which a large-capacity bandwidth is required with use of Massive multi-input and multi-output (MIMO), NEW radio access technology (RAT), or the like.

The following description relates to a distributed antenna system capable of providing a time deterministic traffic transmission service of low latency, low delay variation, and low packet loss as in a circuit-based distributed antenna system while performing packet-based traffic processing.

The following description relates to a distributed antenna system capable of accommodating backhaul traffic of another base station system or centralized radio access network (C-RAN) structure fronthaul traffic with MAC-PHY function splits.

In one aspect, a distributed antenna system includes a headend unit, one or more time sensitive network (TSN) switches, and one or more remote units, and the headend unit, the TSN switch, and the remote unit constitute a fronthaul transport network to which TSN standards are applied.

The headend unit is connected to a base station of a mobile communication system to receive a downlink analog radio frequency (RF) signal, generate an Ethernet frame including In-phase and quadrature component (IQ) data sampled from the received analog RF signal, transmit the generated Ethernet frame to the packet-based fronthaul network connected thereto; recover an analog RF signal from IQ data in an uplink Ethernet frame transmitted through the packet-based fronthaul network, and transmit the recovered analog RF signal to the base station of the mobile communication system connected thereto.

The TSN switch corresponds to a hub unit, which is an extension unit of a circuit-based distributed antenna system, and constitutes a traffic transmission path between the headend unit and the remote unit as an Ethernet network to which TSN standards are applied.

The remote unit recovers an analog RF signal from IQ data in a downlink Ethernet frame transmitted through the packet-based fronthaul network and sends the analog RF signal to a user terminal through an antenna and receives an analog RF signal transmitted from the user terminal through the antenna, generates an uplink Ethernet frame including IQ data sampled from the received analog RF signal, and transmits the generated uplink Ethernet frame to the packet-based fronthaul network connected thereto.

The packet-based fronthaul network constituted by the headend unit, the TSN switch, and the remote unit allows traffic to be transmitted in a time deterministic manner while minimizing packet loss through Ethernet to which TSN standards are applied.

In one aspect, the TSN-based distributed antenna system may accommodate backhaul traffic of another base station system and transmit packets with minimum packet loss and in a time-deterministic manner while ensuring quality of service (QoS) through Ethernet to which TSN standards are applied.

In one aspect, the TSN-based distributed antenna system may accommodate fronthaul traffic having various MAC-PHY functions split between a radio unit (i.e., a remote radio head (RRH)) and a base station system (i.e., a base band unit (BBU)) of another base station so that packets are transmitted with minimum packet loss and in a time-deterministic manner while ensuring QoS through Ethernet to which TSN standards are applied.

In one aspect, the TSN-based distributed antenna system further includes an uplink aggregation module, and the TSN switch or the remote unit may aggregate pieces of IQ data included in uplink Ethernet frames through the uplink aggregation module.

Other features and aspects will be apparent from the following detailed description, the drawings, and the claims.

Figure 1:
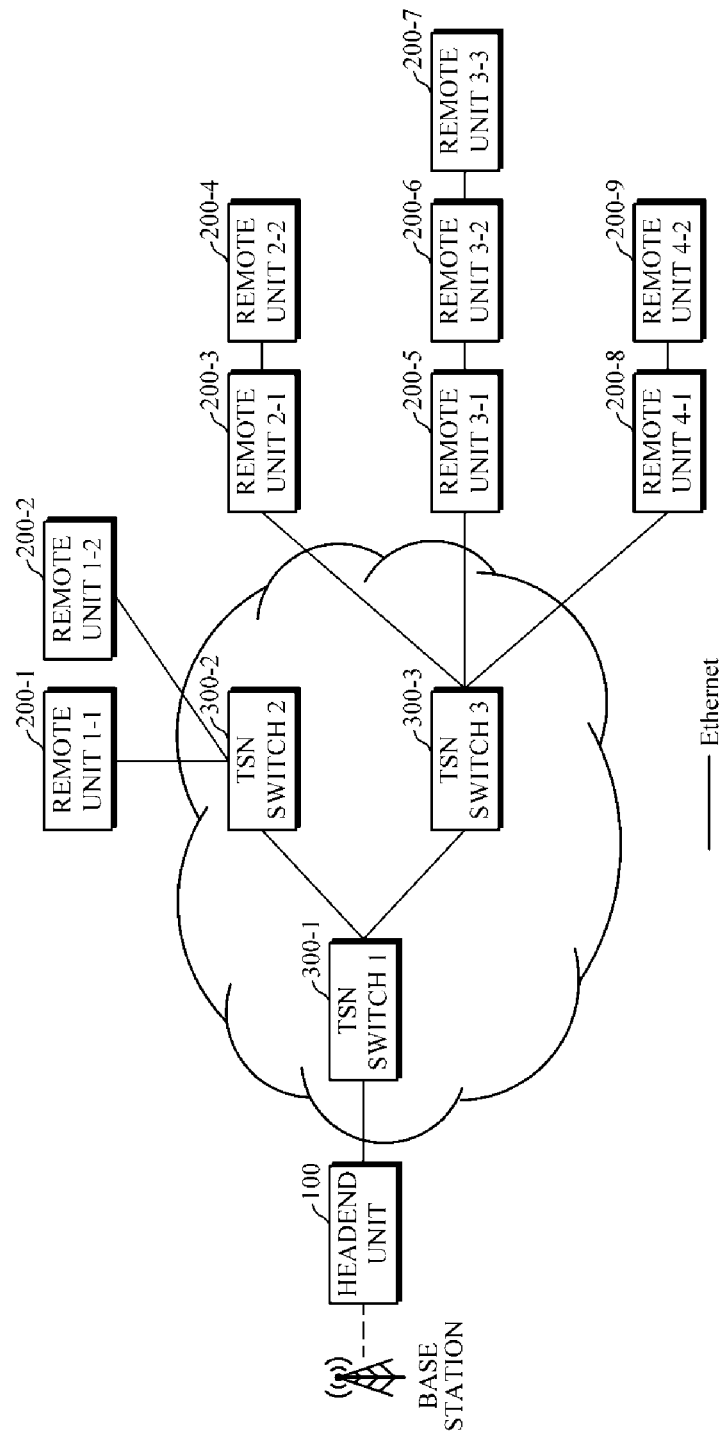
FIG. 1 illustrates a topology of a time sensitive network (TSN)-based distributed antenna system.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The foregoing and additional aspects of the present disclosure will be embodied through the following exemplary embodiments. It should be understood that elements in each exemplary embodiment may allow various combinations unless otherwise specified within the exemplary embodiment. Each block in block diagrams may represent a physical component or a logical expression of partial functions of a single physical component or of functions across a plurality of physical components. A block or part thereof may be an entity representing a set of program instructions. Blocks may, entirely or in part, be implemented as hardware, software, or combination thereof.

FIG. 1 is a block diagram illustrating a topology of a time sensitive network (TSN)-based distributed antenna system. A downlink perspective explanation of the system depicted in FIG. 1 is firstly presented. The distributed antenna system according to an exemplary embodiment shown in FIG. 1 includes a headend unit 100, one or more TSN switches 300, and one or more remote units 200 and sends a downlink signal of a base station of a mobile communication system through an Ethernet-based fronthaul network to which TSN standards are applied.

The headend unit 100 is connected with the base station of the mobile communication system to receive radio signals, that is, various analog radio frequency (RF) signals, to perform digitization and framing on the received radio signals, and to transmit the signals. The headend unit 100 according to the exemplary embodiment generates an Ethernet frame including In-phase and quadrature component (IQ) data digitized and sampled from the received analog RF signal. The headend unit 100 transmits the generated Ethernet frame to the Ethernet-based fronthaul network connected thereto. That is, the headend unit outputs the generated Ethernet frame to an Ethernet port connected to the TSN switch.

The headend unit 100 may include a function of digitizing the analog RF signals received from the base station and generating a Radio over Ethernet (RoE) frame according to the IEEE 1914.3 standard from the digitized analog RF signals and a function of generating an enhanced common public radio interface (eCPRI) frame from the analog RF signals received from the base station.

The headend unit 100 may expand the transmission bandwidth by connecting an additional Ethernet link with the TSN switch 300 and using a Link Aggregation feature. For example, when the headend unit is connected to the TSN switch 300 with 10 Gbps Ethernet links, the headend unit 100 may perform Link Aggregation on two links so that the bandwidth is expanded to 20 Gbps.

A plurality of remote units 200 are arranged at respective remote service locations. Each remote unit 200 is connected to the Ethernet-based fronthaul network and is configured to perform deframing on an Ethernet frame transmitted through the fronthaul network to extract IQ data included in the Ethernet frame, recover an analog RF signal from the extracted IQ data, and send the recovered RF signal to a user terminal (not shown).

Each remote unit 200 may be directly connected to the headend unit 100 through an Ethernet link or may be connected to the headend unit 100 through the TSN switch 300. Alternatively, the remote unit may be connected to the headend unit through another remote unit connected thereto in a cascade structure. FIG. 1 illustrates an example in which a remote unit 2-2 200-4 is connected to a headend unit 100 through a remote unit 2-1 200-3 connected to the remote unit 2-2 200-4 in a cascade structure.

Each remote unit 200 may include a function of performing deframing on a RoE frame according to the IEEE 1914.3 standard transmitted by the headend unit 100 and a function of performing deframing on an eCPRI frame.

In addition, each remote unit 200 may expand the transmission bandwidth by connecting an additional Ethernet link with the TSN switch 300 and using the Link Aggregation feature. For example, when a remote unit 200 is connected to the TSN switch 300 with 10 Gbps Ethernet links, the remote unit 200 may perform Link Aggregation on two links so that the bandwidth is expanded to 20 Gbps.

The TSN switch 300 is a switching device that supports the IEEE 802.1 TSN. TSN is a network technology for providing low latency, low delay variation, and low packet loss services on the basis of L2/L3 Ethernet. It enables a time-deterministic transfer of a traffic by a synchronized-time-based scheduling and by ensuring maximum delay time required for switching in the device.

At least one TSN switch 300 is included in an Ethernet frame transmission path between the headend unit 100 and the remote unit 200. The TSN switch 300 corresponds to a hub node serving as an extension node for connecting a plurality of remote units in a distributed antenna system based on a circuit-based fronthaul network.

According to aspects of the disclosure, the TSN switch 300 may be incorporated into the headend unit 100 as a module.

The distributed antenna system according to the exemplary embodiment provides a service capable of transmitting traffic in a time-deterministic manner while minimizing packet loss between the headend unit 100 and the remote units 200 through the Ethernet-based fronthaul network employing TSN standards including the TSN switch 300.

Next, an uplink perspective explanation of the system depicted in FIG. 1 is presented herein below. The TSN-based distributed antenna system according to the exemplary embodiment shown in FIG. 1 includes a headend unit 100, one or more TSN switches 300, and one or more remote units 200 and transmits an uplink signal of a user terminal to a mobile communication base station system through the Ethernet-based fronthaul network to which TSN standards are applied.

The headend unit 100 according to the exemplary embodiment receives an uplink signal transmitted by the remote unit through the packet-based fronthaul in an Ethernet frame, performs deframing on the received Ethernet frame to extract IQ data, and recovers the extracted IQ data into the radio signal. That is, the IQ data may be recovered into a digital RF signal or may be recovered into an analog RF signal through analog conversion. The recovered radio signal is transmitted through an interface connected to the base station of the mobile communication system. That is, the headend unit 100 recovers a radio signal from an Ethernet frame input through an Ethernet port connected to the TSN switch 300 and outputs the radio signal to the base station of the mobile communication system.

The Ethernet frame from the remote unit 200 received by the headend unit 100 may be a RoE frame of the IEEE 1914.3 standard or may be an eCPRI frame. Accordingly, the headend unit 100 may perform the deframing by identifying a RoE frame or an eCPRI frame.

A plurality of remote units 200 are arranged at each remote service location. Each remote unit 200 is connected to the Ethernet-based fronthaul network and serves to receive an analog RF signal transmitted by a user terminal and digitizes and samples the received analog RF signal to generate an Ethernet frame including IQ data. Each remote unit 200 transmits the generated Ethernet frame to the headend unit through the packet-based fronthaul network.

Each remote unit may include a function of generating a RoE frame according to the IEEE 1914.3 standard that is digitized and sampled from analog RF signals received from a user terminal and a function of generating an eCPRI frame analog RF signals from analog RF signals received from a user terminal.

Figure 2:
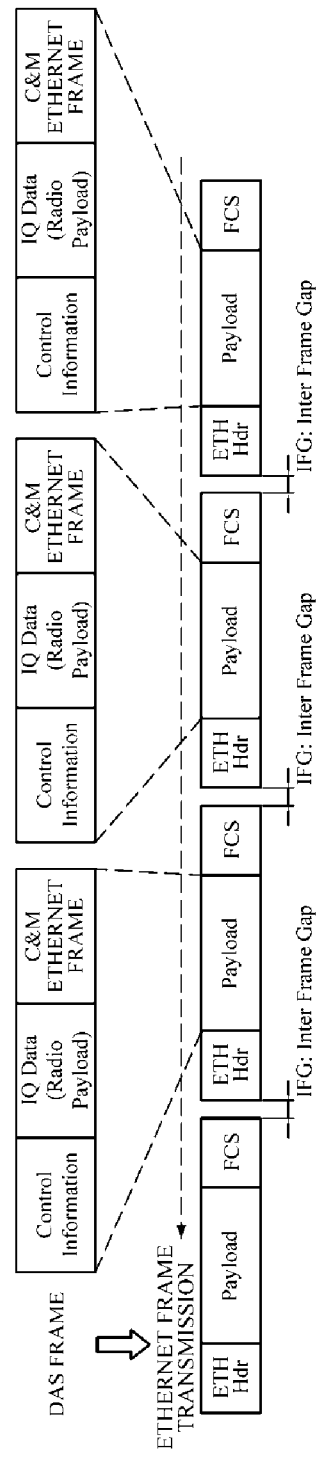
FIG. 2 illustrates an Ethernet frame used for IQ data transmission in a TSN-based distributed antenna system according to an exemplary embodiment.

FIG. 2 is a conceptual view illustrating an Ethernet frame used for IQ data transmission in a TSN-based distributed antenna system according to the exemplary embodiment. In the TSN-based distributed antenna system according to the exemplary embodiment, for transmission of downlink or uplink signals, IQ data is transmitted in an Ethernet frame unlike the conventional circuit-based distributed antenna system. Referring to FIG. 2, the TSN-based distributed antenna system according to the exemplary embodiment may transmit an entire distributed antenna system (DAS) frame from a circuit-based distributed antenna system by including the DAS frame in a payload of an Ethernet frame. The DAS frame shown in FIG. 2 indicates inclusion of control information, IQ data, and a control & management (C&M) Ethernet frame therein, rather than indicating limitatively that control information, IQ data, and a C&M Ethernet frame are included therein in the order shown in FIG. 2.

According to an exemplary embodiment of the present disclosure, the payload of the downlink Ethernet frame transmitted from the headend unit to the remote unit or the uplink Ethernet frame transmitted from the remote unit to the headend unit may include IQ data, control information, and a C&M Ethernet frame.

The control information and the C&M Ethernet frame are control and management data that are required for each device to provide services by interworking with another device in a distributed antenna system. The control information is used for communication between devices directly connected to each other and is transmitted using a low-level control field designated with specific fields in a frame. The C&M Ethernet frame is an Ethernet frame that is included in a DAS frame and transmitted and is used for communication between devices that are not directly connected to each other, unlike the control field.

Figure 3:
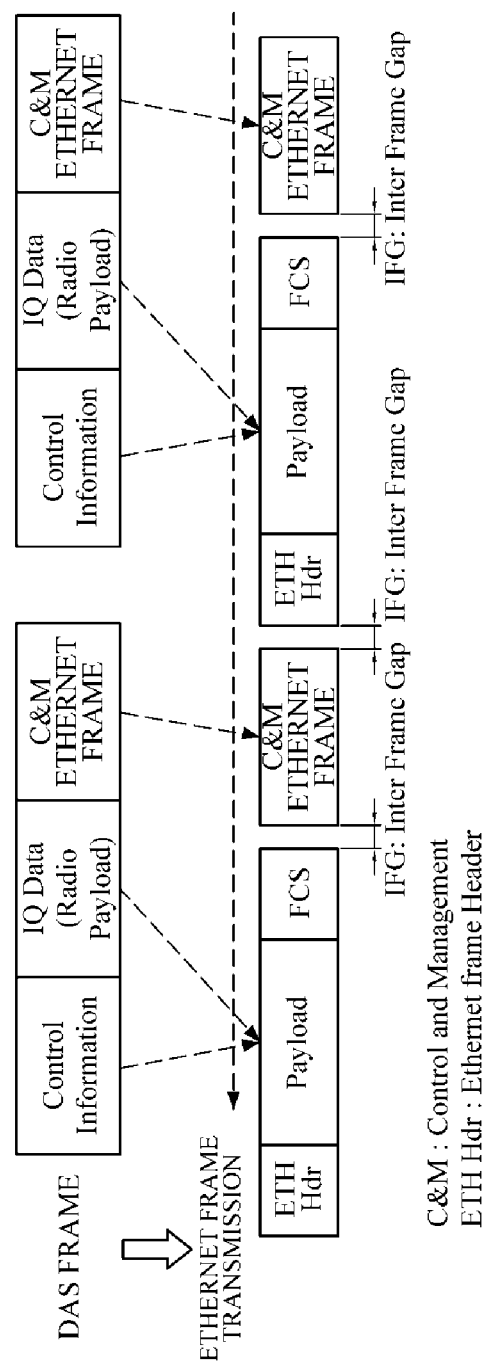
FIG. 3 illustrates an Ethernet frame used for IQ data transmission in a TSN-based distributed antenna system according to another exemplary embodiment.

FIG. 3 is a conceptual view illustrating an Ethernet frame used for IQ data transmission in a TSN-based distributed antenna system according to another exemplary embodiment. Unlike the embodiment shown in FIG. 2, in the TSN-based distributed antenna system according to the exemplary embodiment shown in FIG. 3, control information and IQ data of a DAS frame transmitted from a circuit-based distributed antenna system are included in a payload of an Ethernet frame and transmitted, and a C&M Ethernet frame is extracted and separately transmitted. The DAS frame shown in FIG. 3 indicates inclusion of control information, IQ data, and a C&M Ethernet frame therein, rather than limitatively indicating that control information, IQ data, and a C&M Ethernet frame are included therein in the order shown in FIG. 3.

Figure 4:
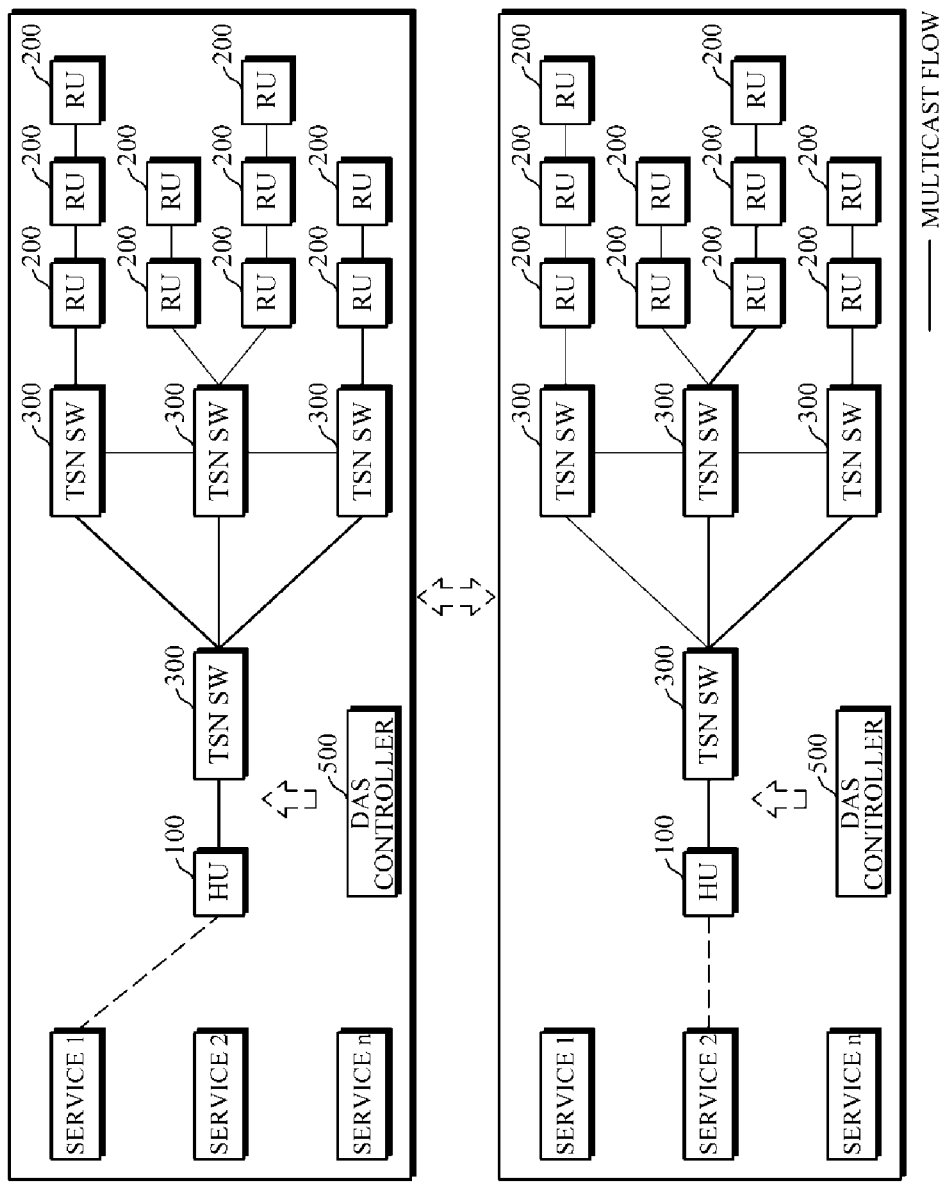
FIG. 4 illustrates an example of a multicast flow transmission path for each service domain in a TSN-based distributed antenna system according to another exemplary embodiment.

FIG. 4 is a view illustrating an example of a multicast flow transmission path for each service domain in a TSN-based distributed antenna system according to another exemplary embodiment. The upper part and the lower part of FIG. 4 illustrates two differently set flow transmission paths for the same physical system. Both a dark line or a light line indicates physical connection. A dark line additionally indicates a multicast flow for a corresponding service domain. A dashed line indicates that the diagram part is set as shown by a DAS controller for the service domain.

The TSN-based distributed antenna system may set a different flow transmission path for each service with respect to a downlink transmission path. In order to reduce the amount of traffic to be transmitted, frames are transmitted in an end-to-end manner, such that a frame from a headend unit 100 is transmitted in a multicasting manner rather than being individually transmitted to a respective remote unit 200 as a destination. FIG. 4 shows an example of multicast flow transmission paths independently set for service 1 and service 2.

Accordingly, the downlink Ethernet frame transmitted from the headend unit 100 may be multicast through flow transmission paths each independently set for a respective service domain to be transmitted to one or more remote units 200.

Each remote unit 200 or each TSN switch 300 in this system may be configured by receiving a flow transmission path for each service domain through a DAS controller 500. In this case, the DAS controller 500 and each TSN switch 300 or each remote unit 200 may interwork with each other through Openflow protocol used in software defined network (SDN). Thus, the TSN-based distributed antenna system presented herein may serve a different flow transmission path dynamically for each new service or capacity demand. The criterion for classifying service domains is not particularly limited, but service domains may be classified on the basis of mobile operators. That is, a different multicast flow transmission path may be set by each mobile operator.

In addition, the service domains may be classified on the basis of frequency bands. For example, in the case of LTE, service domains may be divided into an 800 MHz band, a 1.8 GHz band, and a 2.6 GHz band such that different multicast flow transmission paths are set for the divided service domains.

In addition, the service domains may be classified on the basis of a cell sector indicating a service area according to the directivity of an antenna, that is, a base station antenna sector. For example, when a three-sector antenna is used, service domains may be classified by sectors divided every 120 degrees, and a different multicast flow transmission path may be set for each service domain.

Another method of classifying service domains may include division into DAS service domains between a headend unit and a remote unit, carrier fronthaul service domains in which a base band unit (BBU) and a remote radio head (RRH) separated from a C-RAN structure are connected through a DAS, carrier backhaul service domains in which the separated BBU and RRH are both connected to a DAS network, and backhaul service domains in which general Internet Protocol (IP) packet networks, such as WiFi, are connected and subdivided thereof by intended uses.

As such, the TSN-based distributed antenna system according to the exemplary embodiment of the present disclosure may set a different multicast flow transmission path for each service domain, and in this case, the service domains may be divided according to a criterion including a mobile operator, a frequency band, or a base station antenna sector.

Figure 5:
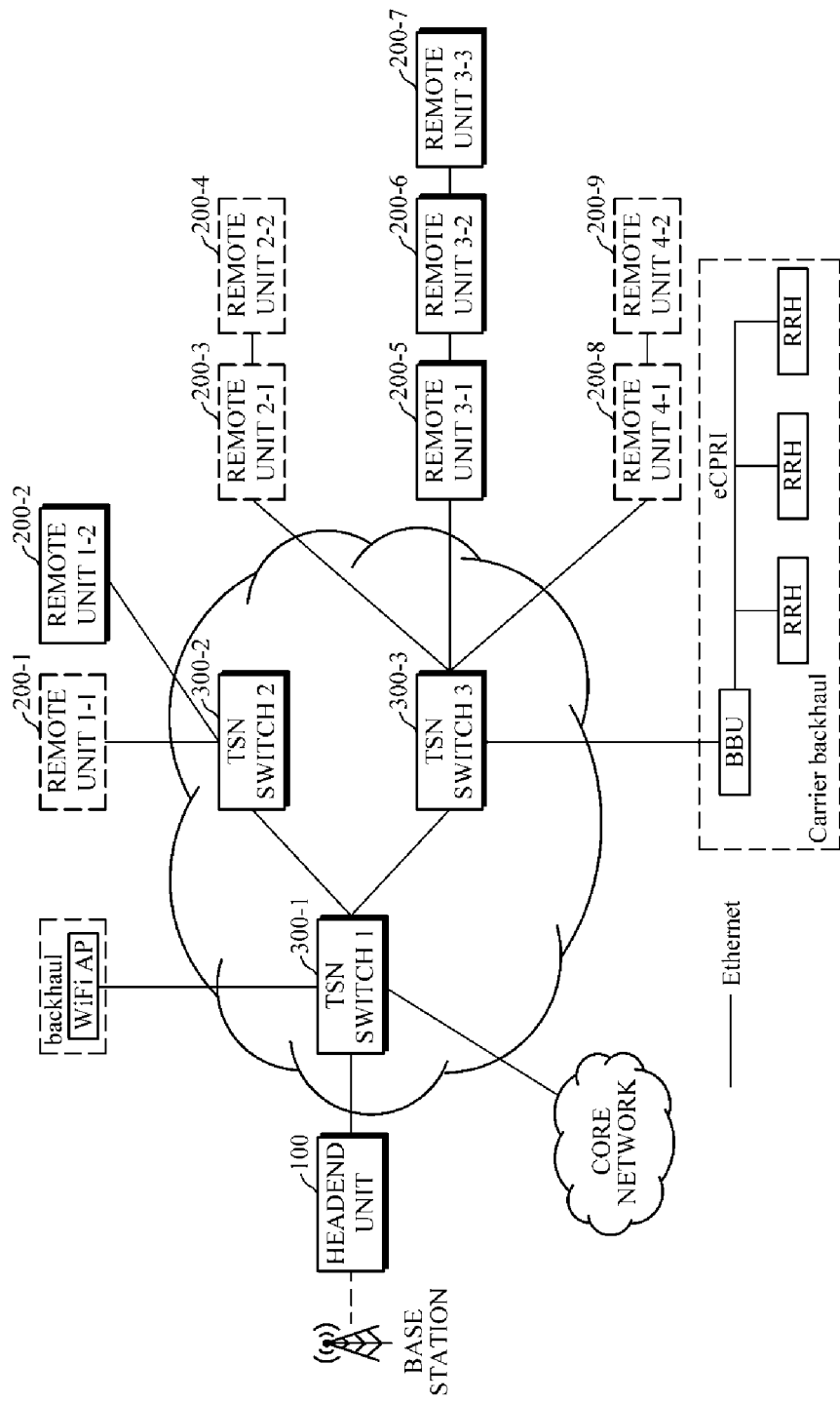
FIG. 5 illustrates a network connection for a backhaul service in a TSN-based distributed antenna system.

FIG. 5 illustrates a network connection for a backhaul service in a TSN-based distributed antenna system. Referring to FIG. 5, a TSN switch 1 300-1, which is one of TSN switches constituting the transport network, is connected to a core network of a mobile communication system through Ethernet. According to another aspect, the headend unit 100 may be connected to the base station of the mobile communication system through Ethernet or in an analog manner. In the case of analog connection, the headend unit 100 receives a signal from the base station, performs analog-to-digital (A/D) conversion on the signal, and converts the original signal into an Ethernet frame. In the case of Ethernet connection, the base station transmits a signal, which is subjected to A/D conversion, to the headend unit 100.

The TSN-based distributed antenna system may transmit backhaul service traffic of another base station system including a small cell. According to an example shown in FIG. 5, a BBU for transmitting and receiving an eCPRI protocol or an RF signal similar to the eCPRI protocol to/from an RRH through Ethernet may be connected to a TSN switch 3 300-3 so that backhaul traffic of the BBU may be transmitted and received using the DAS network. In this case, since traffic of yet another base station system also uses the TSN-based transport network, low latency, low-delay variation, and low packet loss transmission is achieved on backhaul traffic from a base station system, and by synchronizing the times between nodes of the network and performing scheduling on the basis of the synchronized time, the backhaul traffic is transmitted in a time-deterministic manner while ensuring the maximum delay time required for switching of the traffic in a device.

That is, the packet-based network of the TSN-based distributed antenna system may transmit downlink backhaul traffic from the core network to another mobile communication base station system while ensuring quality of service (QoS).

Referring to FIG. 5, a traffic for user terminals (not shown) connected to a WiFi AP connected to a TSN switch may be transmitted through the packet-based fronthaul network of the TSN-based distributed antenna system.

Figure 6:
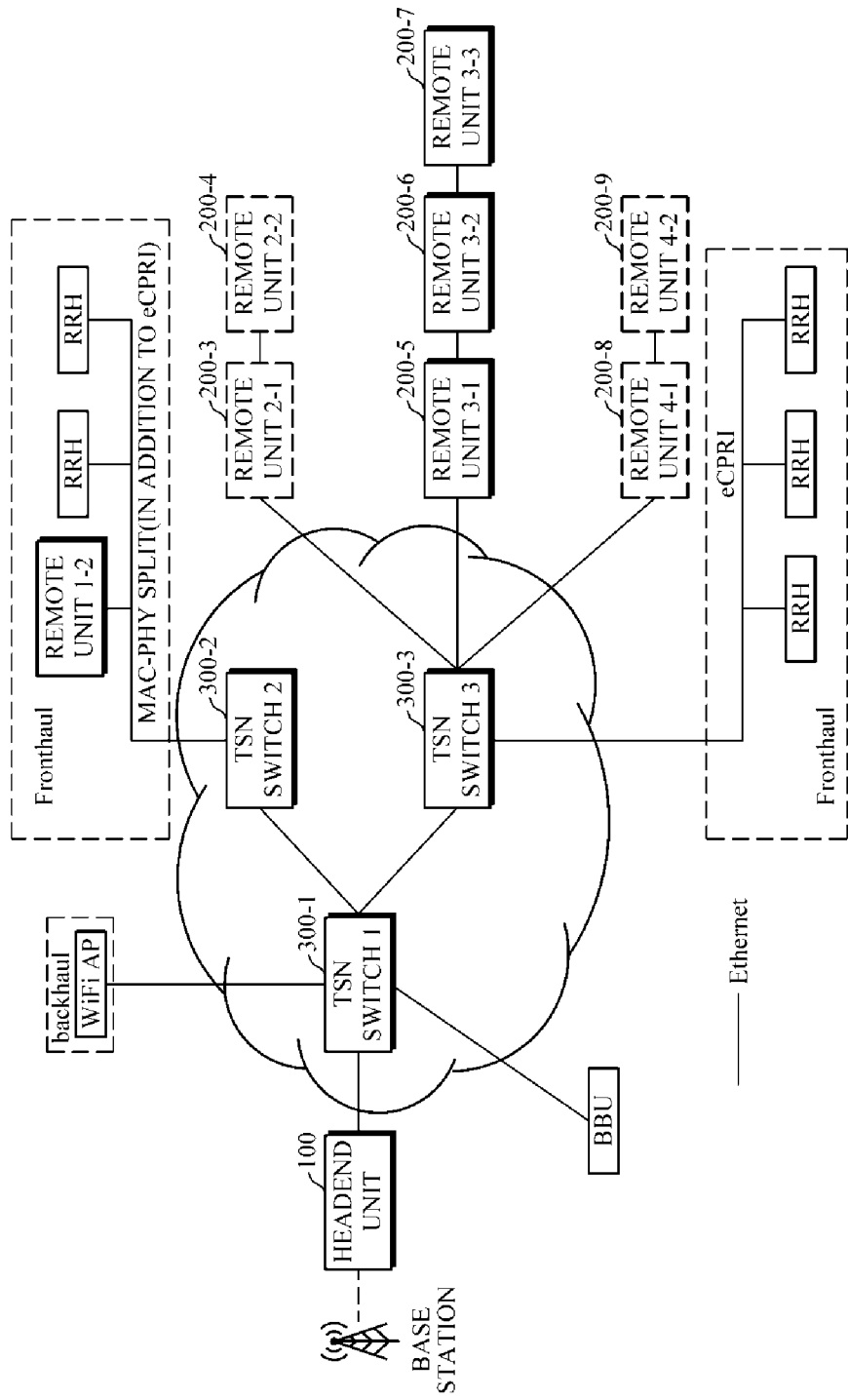
FIG. 6 illustrates a network connection for a fronthaul service of a base station in a TSN-based distributed antenna system.

FIG. 6 is a block diagram illustrating a network connection for a fronthaul service of a base station in a TSN-based distributed antenna system. Referring to FIG. 6, a TSN switch 1 300-1, which is one of TSN switches constituting the transport network, is connected to the base station of the mobile communication system through Ethernet. According to an embodiment of the present disclosure, the headend unit 100 may be connected to the base station of the mobile communication system through Ethernet or in an analog manner.

Downlink traffic from the base station of the mobile communication system may be transmitted to an RRH through the fronthaul network of the TSN-based distributed antenna system. Also, uplink traffic from a radio unit (RRH) of the base station may be transmitted to a mobile communication base station system (BBU) through the fronthaul network of the TSN-based distributed antenna system. In both cases, a frame to be transmitted may be an eCPRI frame, which is a protocol for a packet-based fronthaul service. However, the present disclosure is not limited thereto, and a frame for a fronthaul service configured with various function splits may be transmitted. For example, a MAC-PHY function split may be one of a function split between a radio resource control (RRC) and packet data convergence protocol (PDCP) of Option 1, a function split between PDCP and High radio link control (RLC) of Option 2, a function split between High RLC and Low RLC of Option 3, a function split between Low RLC and High medium access control (MAC) of Option 4, a function split between High MAC and Low MAC of Option 5, a function split between Low MAC and High physical (PHY) of Option 6, or a function split between High PHY and Low PHY of Option 7. Since the function splits of Option 1 to Option 7 correspond to a known technology, detailed descriptions thereof will be omitted.

The TSN-based distributed antenna system may transmit various types of packet-based fronthaul downlink traffic having MAC-PHY function splits in addition to eCPRI. According to the example shown in FIG. 6, a BBU is connected to a TSN switch and transmits a frame based on eCPRI protocol or another MAC-PHY function split to an RRH connected to another TSN switch using the DAS packet-based fronthaul network through Ethernet. In this case, the traffic also uses the TSN-based transport network, and thus low latency, low delay variation, and low packet loss transmission is performed on packet-based fronthaul traffic from a BBU, and by synchronizing the times between nodes of the network and performing scheduling on the basis of the synchronized time, the fronthaul traffic is transmitted in a time-deterministic manner while ensuring the maximum delay time required for switching of the traffic in a device.

That is, the packet-based fronthaul network of the TSN-based distributed antenna system may transmit packet-based backhaul traffic from the mobile communication base station system to the radio unit of the base station while improving and/or ensuring the QoS. In addition, it may transmit packet-based fronthaul traffic from a radio unit (RRH) of a base station to a mobile communication base station system (BBU) while improving and/or ensuring the QoS.

Figure 7:
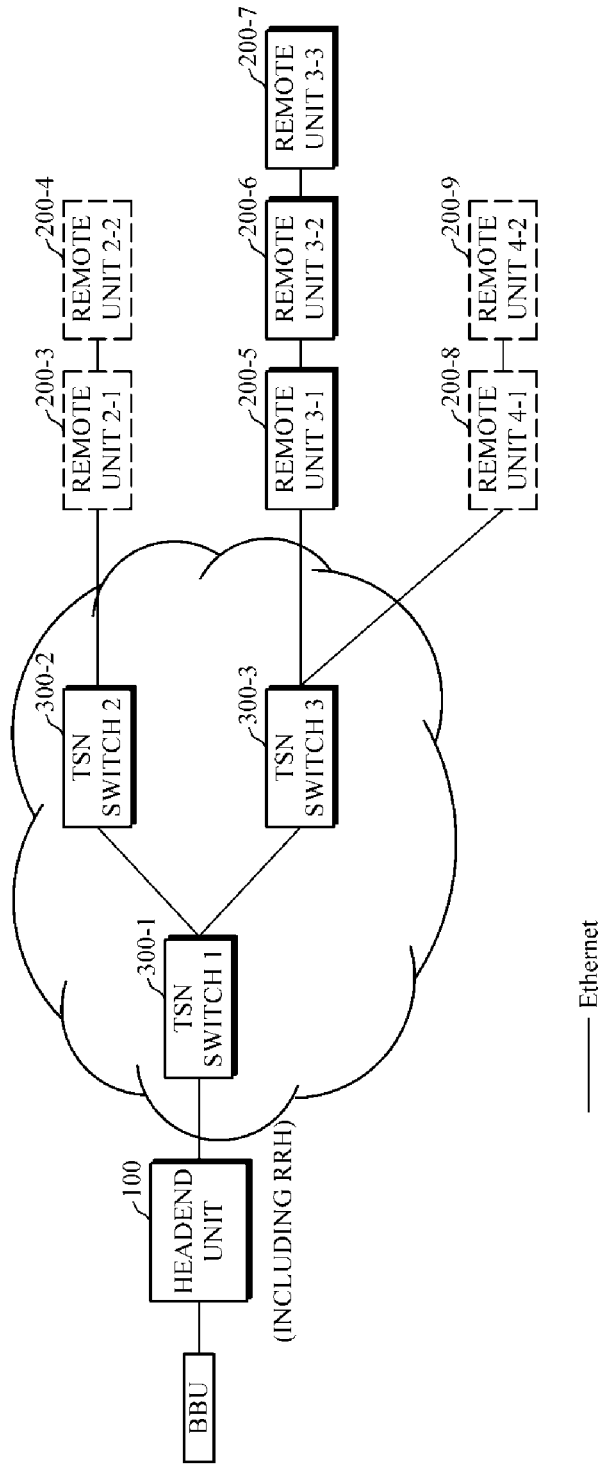
FIG. 7 illustrates a network connection for a relay service for relaying a wireless RF signal by including an RRH function in a headend unit of a TSN-based distributed antenna system.

FIG. 7 is a block diagram illustrating a network connection for a relay service for relaying a wireless RF signal by including an RRH function in a headend unit of a TSN-based distributed antenna system. Referring to FIG. 7, the headend unit 100 is connected to the mobile communication base station system (BBU) through Ethernet. In this case, the headend unit 100 may transmit downlink fronthaul traffic received from the BBU to a remote unit, and may convert an uplink Ethernet frame received from a remote unit into fronthaul traffic and transmit the fronthaul traffic to the BBU, through the packet-based fronthaul network. The downlink traffic from the BBU of the mobile communication system may be received by the headend unit 100 of the TSN-based distributed antenna system including the RRH function and may be relayed and transmitted to the remote unit through the TSN network. The headend unit of the TSN-based distributed antenna system may transmit a wireless RF signal received from the remote unit to the BBU of the mobile communication system. In this case, the frame received by the headend unit 100 may be an eCPRI frame, which is a protocol for a packet-based fronthaul service. However, the present disclosure is not limited thereto, and a frame for a fronthaul service configured with various function splits (MAC-PHY) may be received by the headend unit 100. In this case, the MAC-PHY function split may be one of a function split between an RRC and a PDCP of Option 1, a function split between PDCP and High RLC of Option 2, a function split between High RLC and low RLC of Option 3, a function split between Low RLC and High MAC of Option 4, a function split between High MAC and Low MAC of Option 5, a function split between Low MAC and High PHY of Option 6, or a function split between High PHY and Low PHY of Option 7. Since the function splits of Option 1 to Option 7 correspond to a known technology, detailed descriptions thereof will be omitted.

The headend unit 100 of the TSN-based distributed antenna system may transmit the downlink traffic to a remote unit 300 through Ethernet. In this case, the traffic also uses the TSN-based transport network, and thus low latency, low delay variation, and low packet loss transmission is achieved. In addition, by synchronizing the times between nodes of the network and performing scheduling on the basis of the synchronized time, the traffic is transmitted in a time-deterministic manner while ensuring maximum delay time required for switching of the traffic in a device.

Figure 8:
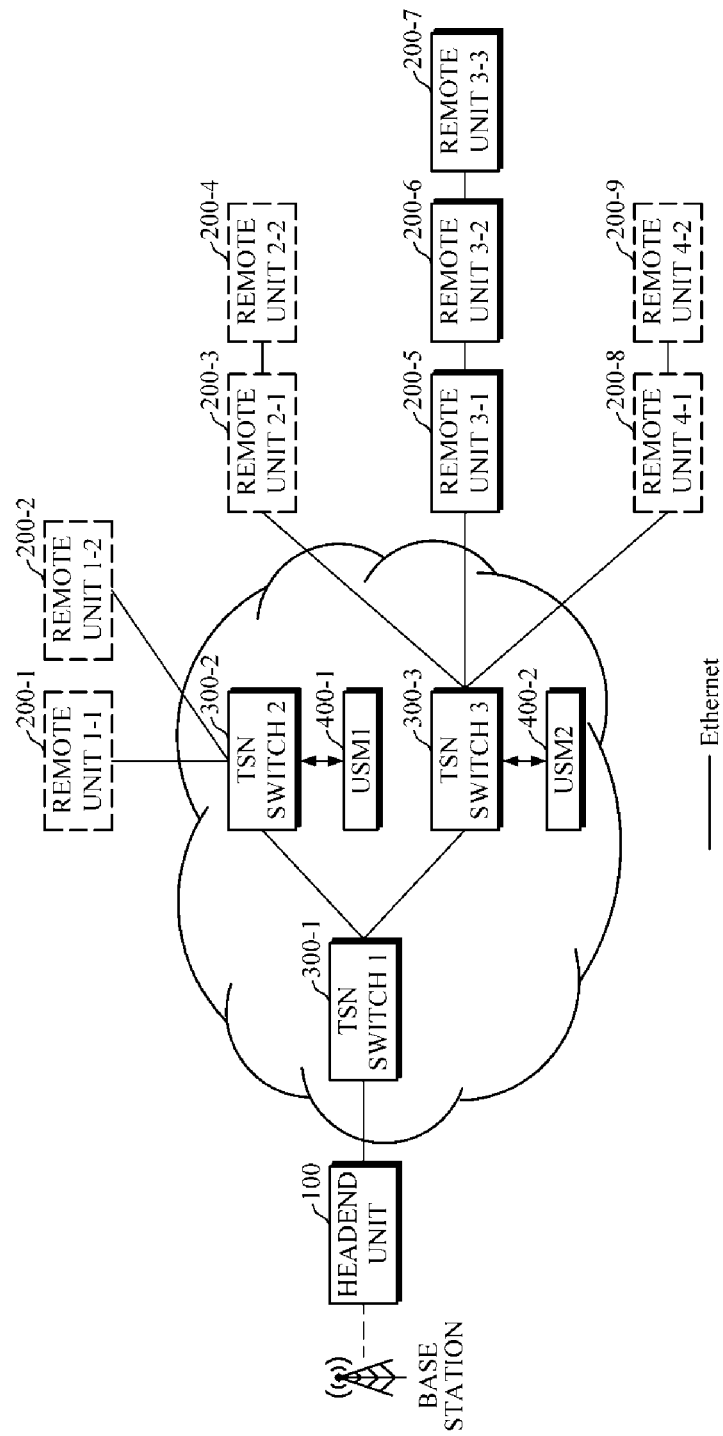
FIG. 8 illustrates interworking of a TSN switch and an uplink aggregation module in a TSN-based distributed antenna system according to another exemplary embodiment.

FIG. 8 is a block diagram illustrating interworking of a TSN switch and an uplink aggregation module in a TSN-based distributed antenna system according to another exemplary embodiment. Referring to FIG. 8, the uplink aggregation module 400 is connected to a TSN switch 300 and aggregates pieces of IQ data of uplink Ethernet frames transmitted through a plurality of uplink transmission paths to generate a single Ethernet frame including the aggregated IQ data and transmits the generated Ethernet frame to the TSN switch 300 connected thereto.

Referring to FIG. 8, an uplink aggregation module 1 (USM1) 400-1 receives Ethernet frames from a plurality of remote units 200-1 and 200-2 connected thereto through a TSN switch 2 300-2 connected thereto. Although not shown in FIG. 8, the USM 400 may receive an Ethernet frame from a lower TSN switch 300, to which remote units 200 are directly connected, through the TSN switch 300 connected thereto. The uplink Ethernet frames input to the TSN switch 300-2 connected to the USM 400-1 may be identified by real time IQ data streams that are individually sent by the respective remote units 200-1, 200-2 according to frame classification of the corresponding TSN switch 300-2. Such an identification may be implemented using a TSN flow that is represented by a sender address, a receiver address, virtual LAN (VLAN) information, and other additional pieces of information that are defined in the TSN specification or using a frame/packet classifier provided by a general switch. The TSN switch 300 connected to the USM 400 transmits an Ethernet frame, which requires aggregation, to the USM and transmits an Ethernet frame, which does not require aggregation, to the next upstream side according to the result of the classifier. Such determination of a policy and input is performed before the TSN-based distributed antenna system is operated.

In order to facilitate aggregation in the USM 400, each remote unit 200 is defined to transmit and receive a plurality of different IQ data streams in units with which aggregation is to be performed. For example, when a remote unit is a multi-band remote unit supporting multiple bands at the same time, the remote unit is defined to simultaneously transmit and receive radio signals of several bands (corresponding to bands defined in 3GPP standards for LTE) such that the radio signals are divided by bands, by operators within a band, or by sectors within an operator depending on ease of aggregation and are identified by a plurality of different IQ data streams. Such a division is previously determined before the TSN-based distributed antenna system is operated so that the result of the determination is transmitted to the setting of individual devices constituting the TSN-based distributed antenna system. The above description of the remote unit also applies to the headend unit constituting the TSN-based distributed antenna system.

The USM receives Ethernet frames transmitted from a plurality of remote units requiring aggregation from a TSN switch connected thereto, performs classification on the frames in a similar way as in the TSN switch connected to the USM, identifies the frames by IQ data streams sent by the respective remote units, and stores the frames by IQ data streams in a volatile high-speed memory, such as an internal packet buffer. The USM, which temporarily stores a plurality of IQ data streams, is previously set about which IQ data stream is aggregated with which IQ data stream. According to such a presetting, the USM may perform aggregation between at least two individual IQ data streams. The method of aggregation may be achieved through a general diversity combining in a multiple receiving antenna including simple summation and the like. The method of summation is not limited and various summation methods may be used.

In addition, when the USM performs summation, the summation is performed considering the time phase of each IQ data stream to be aggregated. For example, when IQ data streams are received from two remote units located at spatial distances of 1 Km and 10 Km, respectively, a time phase difference occurs between the two IQ data streams. When the summation is performed without considering the time phase difference, the radio signal may be subject to quality degradation, such as fading. Even worse, communication between a base station and a terminal may fail due to the TSN-based distributed antenna system. However, since components of the TSN-based distributed antenna systems employing the TSN standards are accurately time-synchronized, the above constraints may be eliminated by allowing each remote unit to additionally transmit time information (a timestamp) about the transmission point of time when transmitting IQ data and allowing the USM to perform aggregation on the basis of the time information for each aggregation target data stream.

That is, as described above, the TSN distributed antenna system may further include one or more USMs for aggregating IQ data of uplink Ethernet frames transmitted through different transmission paths in addition to the headend unit, the TSN switch, and the remote unit. Among a plurality of TSN switches constituting the transport network, the TSN switch connected to a USM may aggregate pieces of IQ data of received Ethernet frames using the USM and transmit an uplink Ethernet frame including the aggregated IQ data through an uplink port.

The TSN switch transmits an uplink Ethernet frame by assigning a transmitted new Ethernet frame a new transmission path directed to the headend unit.

In the case of a downlink transmission path, a downlink Ethernet frame is transmitted from the headend unit to a destination remote unit without changing the downlink transmission path. However, in the case of an uplink transmission path, an uplink Ethernet frame generates a new Ethernet frame on each instance of being aggregated by a USM so that the existing uplink transmission path is terminated in the TSN switch interworking with the USM, and the new Ethernet frame is transmitted through a different uplink transmission path.

In FIG. 8, an uplink transmission path of an uplink Ethernet frame transmitted by a remote unit 2-2 200-4 has a start point of the remote unit 2-2 200-4 and a destination of a TSN switch 3 200-3. An uplink transmission path of an uplink Ethernet frame transmitted by a remote unit 2-1 200-3 has a start point of the remote unit 2-1 200-3 and a destination of the TSN switch 3 200-3. An uplink transmission path of a new uplink Ethernet frame generated by the TSN switch 3 200-3 through a USM has a start point of the TSN switch 3 200-3 and a destination of the headend unit 100.

Whether to aggregate uplink IQ data by interworking the USM and the TSN switch is determined by considering a delay and a bandwidth of an uplink packet. Since the aggregating of an uplink packet increases the delay but decreases the bandwidth, the delay and the bandwidth need to be considered together in the design.

Figure 9:
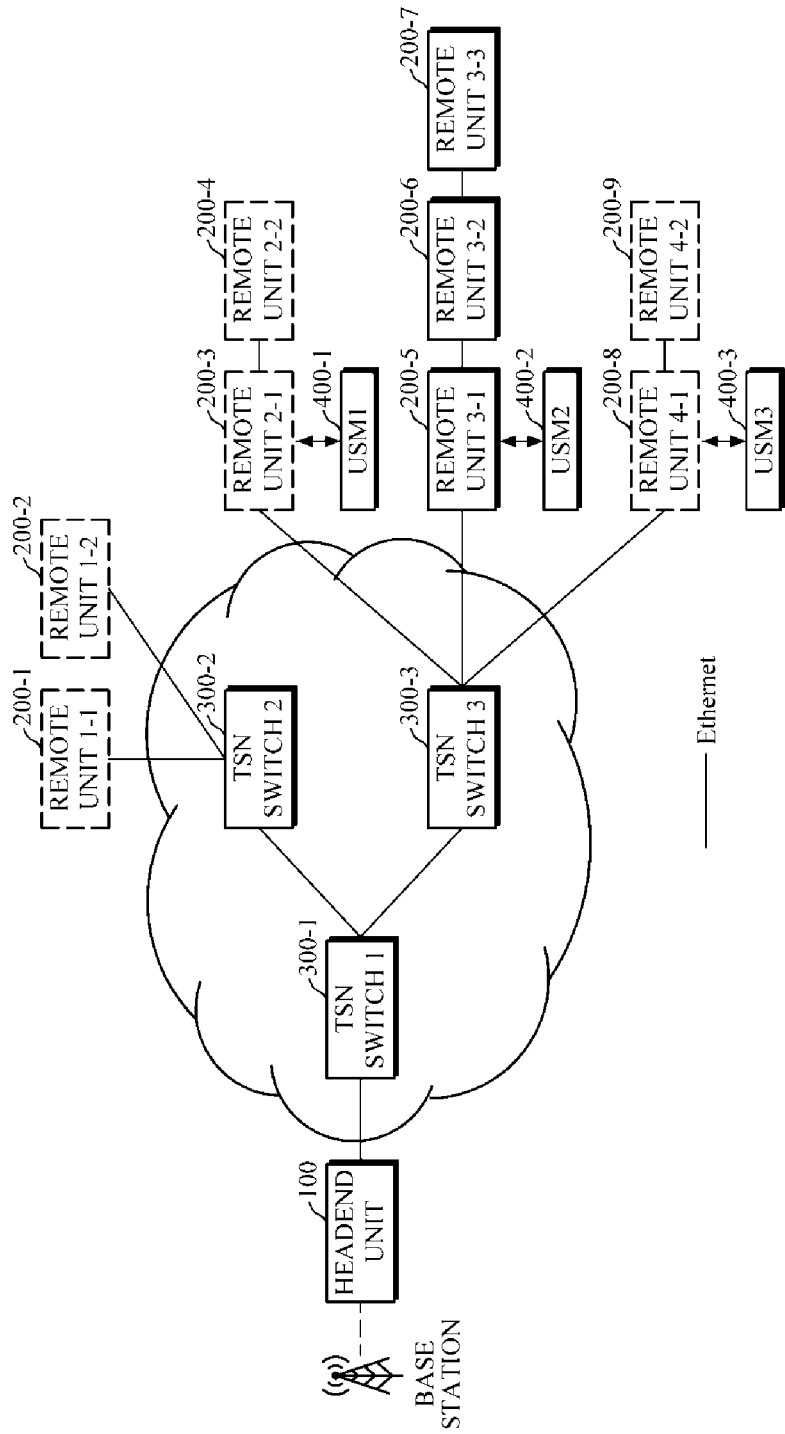
FIG. 9 illustrates interworking of a remote unit and an uplink aggregation module in a TSN-based distributed antenna system according to another exemplary embodiment.

FIG. 9 is a block diagram illustrating interworking of a remote unit and an uplink aggregation module in a TSN-based distributed antenna system according to another exemplary embodiment. Referring to FIG. 9, the uplink aggregation module 400 is connected to a remote unit 200 and aggregates pieces of IQ data of uplink Ethernet frames transmitted through a plurality of uplink transmission paths, generates a single Ethernet frame including the aggregated IQ data, and transmits the generated Ethernet frame to a remote unit connected thereto.

Among a plurality of remote units in the TSN-based distributed antenna system, a remote unit that receives an uplink Ethernet frame from a lower remote unit connected thereto in a cascade structure and is connected to a USM may, using the USM, aggregate IQ data of the received Ethernet frame with IQ data of a self-generated Ethernet frame and may transmit an uplink Ethernet frame including the aggregated IQ data through an uplink port. The remote unit transmits an uplink Ethernet frame by assigning a transmitted new Ethernet frame a new transmission path directed to the headend unit.

In the case of a downlink transmission path, a downlink Ethernet frame is transmitted from the headend unit to a destination remote unit without changing the downlink transmission path. However, in the case of an uplink transmission path, an uplink Ethernet frame generates a new Ethernet frame on each instance of being aggregated by a USM so that the existing uplink transmission path is terminated in a remote unit interworking with the USM, and the new Ethernet frame is transmitted through a different uplink transmission path.

In FIG. 9, a remote unit 2-1 200-3 interworks with a USM 1 400-1 so that IQ data received through an antenna of the remote unit 2-1 200-3 is aggregated with IQ data included in an uplink Ethernet frame transmitted by a remote unit 2-2 200-4 connected to the remote unit 2-1 200-3 in a cascade structure through the USM 1 400-1. An uplink transmission path of the uplink Ethernet frame transmitted by the remote unit 2-2 200-4 has a start point of the remote unit 2-2 200-4 and a destination of the remote unit 2-1 200-3. An uplink transmission path of the new Ethernet frame in which the IQ data of the remote unit 2-1 200-3 is aggregated with the IQ data of the remote unit 2-2 200-4 has a start point of the remote unit 2-1 200-3 and a destination of the headend unit 100.

Whether to aggregate uplink IQ data by interworking the USM and the remote unit is determined by considering a delay and a bandwidth of an uplink packet. Since the aggregating of an uplink packet increases the delay but decreases the bandwidth, the delay and the bandwidth need to be considered together in the design.

Although each USM in FIGS. 8 and 9 is illustrated as interworking with the TSN switch or the remote unit, the TSN switch and the remote unit may simultaneously interwork with the respective USMs.

According to another aspect of the disclosure, a TSN switch may be connected to a USM by constructing an input/output (I/O) module inside the TSN switch rather than using a switch port. The construction of an I/O module provides benefits in terms of delay compared to connecting with a cable through a port. The remote unit may also be connected a USM by constructing an I/O module in the device rather than using a cable through a port which also provides benefit in terms of delay compared to connecting with a cable through a port.

As is apparent from the above, the proposed TSN-based distributed antenna system, as a packet-based distributed antenna system through Ethernet, can process a large-capacity traffic by being applied to a mobile communication system that requires a large-capacity traffic with use of a Massive multi-input and multi-output (MIMO), NEW radio access technology (RAT), or the like and can also easily achieve bandwidth increase using Link Aggregation compared to a circuit-based distributed antenna system.

The proposed TSN-based distributed antenna system can provide a time deterministic traffic transmission service of low latency, low delay variation, and low packet loss as in a circuit-based distributed antenna system while performing packet-based traffic processing.

The proposed TSN-based distributed antenna system can accommodate backhaul traffic of another base station system or C-RAN structure fronthaul traffic having variously split MAC-PHY functions.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A distributed antenna system for sending a downlink signal of a base station of a mobile communication system to a user terminal, the distributed antenna system comprising:
   a packet-based network;
   a headend unit connected with the base station of the mobile communication system to receive a radio signal, generate an Ethernet frame including the received radio signal, and transmit the generated Ethernet frame to the packet-based network connected thereto;
   one or more remote units configured to send the radio signal included in the Ethernet frame transmitted through the packet-based network to a user terminal through an antenna; and
   at least one time sensitive network (TSN) switch included on an Ethernet frame transmission path between the headend unit and the remote unit,
   wherein the headend unit includes a remote radio head (RRH) function and is connected to a BBU of a mobile communication base station system through Ethernet, and the headend unit transmits a downlink fronthaul traffic received from the BBU of the mobile communication base station system to the remote unit through the packet-based network.

2. The distributed antenna system of claim 1, wherein a payload of a downlink Ethernet frame transmitted from the headend unit to the one or more remote units includes In-phase and quadrature component (IQ) data, control information, and a control & management (C&M) Ethernet frame.

3. The distributed antenna system of claim 1, wherein a payload of a downlink Ethernet frame transmitted from the headend unit to the one or more remote units includes In-phase and quadrature component (IQ) data and control information, and a control & management (C&M) Ethernet frame is transmitted in a separate Ethernet frame.

4. The distributed antenna system of claim 1, wherein a downlink Ethernet frame transmitted from the headend unit is multicasted to a plurality of the remote units through flow transmission paths that are independently set for different service domains.

5. The distributed antenna system of claim 4, wherein the service domains are divided by a classification criterion among a mobile communication operators, a frequency bands, or a base station antenna sectors.

6. The distributed antenna system of claim 4, wherein the service domains are divided by a plurality of domain categories among DAS service domains, carrier fronthaul service domains, carrier backhaul service domains, and backhaul service domains.

7. The distributed antenna system of claim 1, wherein the headend unit or the at least one TSN switch is connected to a core network of the mobile communication system through Ethernet, and
   backhaul traffic from the core network of the mobile communication system is transferred to a mobile communication base station system through the packet-based network such that quality of service (QoS) of the backhaul traffic is ensured.

8. The distributed antenna system of claim 1, wherein the headend unit or the at least one TSN switch is connected to a mobile communication base station system through Ethernet, and
   packet-based downlink fronthaul traffic from the mobile communication base station system is transferred to a radio unit of the base station through the packet-based network such that quality of service (QoS) of the packet-based downlink fronthaul traffic is ensured.

9. The distributed antenna system of claim 8, wherein the packet based traffic from the mobile communication base station system includes a MAC-PHY function split traffic.

10. The distributed antenna system of claim 1, wherein the TSN switch is connected with the headend unit and/or the remote unit by an additional Ethernet link, expanding bandwidth by performing Link Aggregation on the two Ethernet links.

11. A distributed antenna system for transmitting an uplink signal of a user terminal to a mobile communication base station system, the distributed antenna system comprising:
    a packet-based network;
    a headend unit configured to transmit a radio signal in an Ethernet frame transmitted through the packet-based network to a base station of a mobile communication system connected thereto;
    one or more remote units configured to receive a radio signal transmitted from a user terminal through an antenna, generate an Ethernet frame including the received radio signal, and transmit the generated Ethernet frame to the packet-based network connected thereto; and
    at least one time sensitive network (TSN) switch included on an Ethernet frame transmission path between the headend unit and the remote unit,
    wherein the headend unit includes an RRH function and is connected to the mobile communication base station system (BBU) through Ethernet, and
    the headend unit converts an uplink Ethernet frame received from the remote unit into fronthaul traffic and transmits the converted fronthaul traffic to the mobile communication base station system (BBU) through the packet-based network.

12. The distributed antenna system of claim 11, wherein a payload of an uplink Ethernet frame transmitted from the remote unit to the headend unit includes In-phase and quadrature component (IQ) data, control information, and a control & management (C&M) Ethernet frame.

13. The distributed antenna system of claim 11, wherein a payload of an uplink Ethernet frame transmitted from the remote unit to the headend unit includes In-phase and quadrature component (IQ) data and control information, and a control & management (C&M) Ethernet frame is transmitted in a separate Ethernet frame.

14. The distributed antenna system of claim 12, further comprising one or more uplink aggregation modules configured to generate a single Ethernet frame by aggregating pieces of IQ data of the uplink Ethernet frames transferred through different transmission paths,
   wherein the TSN switch, which is connected to the uplink aggregation module, among the TSN switches aggregates the pieces of IQ data of the received Ethernet frames using the uplink aggregation module and transmits an uplink Ethernet frame including the aggregated IQ data through an uplink port.

15. The distributed antenna system of claim 14, wherein among the remote units, the remote unit that receives the uplink Ethernet frame from the lower remote unit connected thereto in a cascade structured and is connected to the uplink aggregation module aggregates the IQ data of the received Ethernet frame and IQ data of the self-generated Ethernet using the uplink aggregation module and transmits an uplink Ethernet frame including the aggregated IQ data through the uplink port.

16. The distributed antenna system of claim 14, wherein the uplink aggregation module is installed in the TSN switch or the remote unit that includes an input/output (I/O) module and is connected through the I/O module.

17. The distributed antenna system of claim 11, wherein the headend unit or the at least one TSN switch is connected to a core network of the mobile communication system through Ethernet, and
   a backhaul uplink traffic from the mobile communication base station system (base band unit: BBU) is transferred to the core network of the mobile communication system through the packet-based network such that quality of service (QoS) of the backhaul uplink traffic is ensured.

18. The distributed antenna system of claim 11, wherein the headend unit or the at least one TSN switch is connected to the mobile communication base station system through Ethernet, and
   a packet-based uplink fronthaul traffic from a radio unit (remote radio head: RRH) of the base station is transferred to the mobile communication base station system (BBU) through the packet-based network such that quality of service (QoS) of the packet-based uplink fronthaul traffic is ensured.

* * * * *